United States Patent [19]

Cunningham

[11] 4,104,331

[45] Aug. 1, 1978

[54] PROCESS FOR THE PREPARATION OF NOVEL BLOCK POLYMERS

[75] Inventor: Robert E. Cunningham, Akron, Ohio

[73] Assignee: The Goodyear Tire & Rubber Company, Akron, Ohio

[21] Appl. No.: 616,354

[22] Filed: Sep. 24, 1975

Related U.S. Application Data

[63] Continuation of Ser. No. 536,540, Dec. 26, 1974, abandoned, which is a continuation-in-part of Ser. No. 385,916, Aug. 6, 1973, abandoned.

[51] Int. Cl.$^2$ ............................................. C08F 297/04
[52] U.S. Cl. .................................. 260/880 B; 260/879
[58] Field of Search ............................. 260/879, 880 B

[56] References Cited

U.S. PATENT DOCUMENTS

| | | | |
|---|---|---|---|
| 3,621,077 | 11/1971 | Donat | 260/880 B |
| 3,639,523 | 2/1972 | Hayter | 260/880 B |
| 3,853,978 | 12/1974 | Horiie | 260/880 B |

*Primary Examiner*—Paul R. Michl
*Attorney, Agent, or Firm*—J. Y. Clowney

[57] ABSTRACT

There is disclosed a method of preparing a five-membered block polymer, said block polymer exhibiting more superior properties than would be expected from copolymers made from similar blocks.

8 Claims, No Drawings

PROCESS FOR THE PREPARATION OF NOVEL BLOCK POLYMERS

This is a continuation of application Ser. No. 536,540 filed Dec. 26, 1974, now abandoned, which is a continuation-in-part application of Ser. No. 385,916, filed Aug. 6, 1973, now abandoned.

This invention relates to a method of preparing block polymers and to the novel polymers produced thereby.

More specifically, this invention relates to the preparation of a five-membered block polymer using a dilithium initiator.

The use of alkali metals as initiators to make "living polymers" has been described in the prior art for the preparation of certain block copolymers. Many of the prior art block copolymers have limited tensile strength at elevated temperatures, have low tensile at room temperature and in many cases require several laboratory manipulations to achieve the desired product and thus are costly to produce.

In the present invention, a five-membered block polymer is made with the resulting block polymer having superior properties than would be expected from other copolymers made from similar blocks. A polymethacrylonitrile-polybutadiene-polymethacrylonitrile block polymer had a maximum tensile strength of 200 psi at 160 percent elongation. A polystyrene-polybutadiene-polystyrene block polymer had a tensile strength of 1800 psi at 1120 percent elongation at 75° F.

The polymer described in the present invention is a polymethacrylonitrille-polystyrene-polybutadiene-polystyrene-polymethacrylonitrile block which has a tensile strength of 2300 psi at 75° F. with a solvent resistant characteristic. One would expect the tensile value of the block polymer described in this invention to fall somewhere in between the previously described three-membered block polymers, but it unexpectedly showed superior tensile properties and these types of five-membered block polymers have not previously been described.

Thus, according to the invention there is provided a method for the preparation of A'X'A' novel block polymers comprising the steps of polymerizing a solution of a conjugated diene (C) and a styrene or alkyl substituted styrene (B) by contacting said solution with an organodilithium catalyst wherein a conjugated diene-styrene tapered block polymer (X') is formed and characterized in that the conjugated diene units predominate at the central portion of said block polymer with styrene or alkyl substituted styrene being randomly distributed throughout the conjugated diene units and progressively changing in composition until the polystyrene or polyalkyl substituted styrene predominates at the end of said tapered block polymer and injecting methacrylonitrile (A) into the polymerizing zone and continuing the polymerization to form polymethacrylonitrile (A') resulting in the block polymer A'X'A'.

In accordance with the present invention a process is provided for the preparation of tapered block polymers capped on both ends with pure block polymers. By the term "tapered" is meant that the composition of each polymer chain varies from one end to the other. The reason for this is that the reactivities of the two monomers are different. Therefore, the faster reacting monomer is predominately used up in the early polymerization stages with the slower reacting monomer not so quickly being used up. As the faster reacting monomer becomes more used up, then the slower reacting monomer predominates in the polymerization. The result is a polymer chain gradually changing from predominately the faster reacting monomer to the second slower reacting monomer.

It has been stated that the present invention utilizes organodilithium catalysts. Therefore, in the present invention when the conjugated diene-styrene solution is contacted with the organodilithium catalysts, represented as LiRLi wherein R is the organo group and Li the lithium atoms, polymerization starts at both lithium sites on the catalyst. Therefore, we have a central core from which two polymer chains grow. This portion is called the central portion of the tapered polymer block. In the present invention when a conjugated diene (C) and a styrene (B) are introduced to an organodilithium catalyst the conjugated diolefin polymerizes predominately from both lithium groups on the catalyst with some styrene units randomly dispersing themselves throughout until the majority of the butadiene units have polymerized and then the styrene units become the predominately polymerizing units with conjugated diolefin units randomly dispersed throughout. This process results in a tapered polymer (X') that is predominately conjugated diolefin in the central portion with predominately styrene units at the ends and a transition from conjugated diolefin to styrene between the two substantially pure blocks. Illustrative of the type of tapered block polymer formed by B and C is given by the following representation:

It can be seen that the central portion of the polymer near the R group is rich in C units and becomes progressively richer in B units towards the end of the polymer. After all the conjugated diene and styrene are completely reacted, methacrylonitrile (A) is added to the living tapered block polymers forming polymethacrylonitrile blocks (A') on the ends.

The initiators which are useful for this invention are dilithium organo compounds. These compounds are characterized as having two lithium atoms on each organic radical so that polymerization proceeds from each lithium site. They are characterized by the formula Li—R—Li, wherein R may be selected from the group consisting of alkyl, cycloalkyl, aryl, alkaryl and arylalkyl. The initiators themselves are not the thrust of this invention, so that any dilithium organo initiator which will promote polymerization would fall within the scope and spirit of this invention.

The amount of dilithium organo initiators used in the practice of this invention cannot be specifically set down since the amount of initiator used depends on the molecular weight of polymer desired. What can be said is that a catalytic amount is necessary for polymerization. As a general rule, the molecular weight of the polymer is equal to the grams of polymer formed, divided by the moles of initiator employed. Thus, one skilled in the art can adjust the catalyst level to get any desired molecular weight polymer.

By the term "living polymer" is meant that the polymerization has no termination or transfer reactions so that the polymer chains have lithium atoms attached to the chain end when all the monomer is consumed. If additional monomer is added, the polymerization will continue with the new monomer adding on to the already existing chains until it is consumed.

The blocks may have different molecular weights depending upon a specifically desired physical or chemical characteristic of the final product. For example, the molecular weight of the polystyrene block may be varied so that an increased polystyrene molecular weight will impart a stiffness to the resulting block polymer. Not only do the molecular weights of the individual blocks have an effect on the final block polymer, but also the weight ratios of the molecular weights between the individual block affect the properties of the final polymer. For example, if the polystyrene block comprises a majority of the polymer, then the product would have a plastic character.

In the present invention, the polystyrene or alkyl substituted polystyrene molecular weight can range from about 10,000 to 50,000, the poly(conjugated diene) molecular weight can range from about 40,000 to about 150,000 and the polymethacrylonitrile molecular weight can range from about 1,000 to about 20,000. The minimum and maximum could be lower and higher but then other disadvantages such as lower physical properties and difficult processing of the polymers become substantial. A more preferred range of molecular weights would be from about 10,000 to about 20,000 for the polystyrene or alkyl substituted polystyrene block, from about 50,000 to about 80,000 for the poly(conjugated diene) block and from about 1,000 to about 10,000 for the polymethacrylonitrile block. An optimum composition for an elastomeric type block polymer would have about a 3/2 weight ratio of poly(conjugated diene)/polystyrene or alkyl substituted polystyrene with the polymethacrylonitrile comprising about 5 to 20 percent by weight of the total polymer.

Although preferred ranges are set down in this invention, this is not to preclude other molecular weights of the blocks, and also not to preclude other weight ratios of the blocks to be within the scope and spirit of this invention. The preferred ranges set down within this specification are only for the type of rubbery block polymer for which the final polymers will be utilized and are not to be used as a restriction on the scope of this invention.

Representative of the compounds which can be used as initiators in this invention are dilithiomethane, 1,4-dilithiobutane, 1,4-dilithiocyclohexane, 1,4-dilithio-2-ethyl cyclohexane, 1,3-dilithio-4-phenyl butane, 1,10-dilithiodecane, 1,1-dilithiodiphenylene, dilithionaphthalene, dilithioisoprene, dilithiohexane and the like.

The conjugated dienes which can be utilized in this invention are those that are already known in the prior art. The conjugated dienes that can be utilized in this invention contain from about 4 to about 8 carbon atoms. Representative of the conjugated dienes that can be utilized are butadiene, isoprene, 2,3-dimethyl-1,3-butadiene, 1,3-hexadiene, 1,3-butadiene, 1,3-octadiene, piperylene, 2-methyl-1,3-hexadiene, 2-ethyl-1,3-hexadiene, 2,4-octadiene, and the like.

Styrene as well as some of the alkyl substituted styrenes may be utilized in this invention. Representative of the alkyl substituted styrenes which can be utilized in this invention are vinyl toluenes, p(t-butyl) styrene, p(-ethyl) styrene and the like.

The temperature at which the polymerizations of this invention may be conducted is not critical. The temperature may range from about 0° to about 100° C. and more preferred is 20° to 70° C.

The polymerization conditions and techniques should be those characterized as air and moisture-free so as not to hinder the polymerization reactions. These techniques are well known to one skilled in the art.

The polymerizations are usually conducted in the presence of a solvent. The polymerizations may be run in any of the known aliphatic and aromatic hydrocarbon solvents as long as they do not adversely affect the polymerization rate or the final product. Representative of such solvents are toluene, benzene, pentane, hexane, cyclohexane and the like.

The practice of this invention is further illustrated by reference to the following examples which are intended to be representative rather than restrictive of the scope of the invention. Unless otherwise indicated, all parts and percentages are by weight.

EXAMPLE I

A solution was prepared to contain 4 grams (gm) of styrene and 6 gm of butadiene in 160 milliliters (ml) total of a benzene solution. The solution was passed through silica gel, sparged with nitrogen, then charged to a polymerization bottle. To this solution was added 0.90 ml of a 0.20 molar (M) benzene solution of diisoprenyl dilithium. The bottle was tightly capped and the solution polymerized at 50° C. for 4½ hours. A tapered block polymer of polystyrene-polybutadiene-polystyrene was formed.

A solution containing 4 gm of methacrylonitrile in 10 ml of a benzene solution was passed through silica gel and sparged with nitrogen. Gas chromatographic analysis of this solution showed 3.4 gm of methacrylonitrile per 10 ml of solution after sparging.

The polymerization bottle was cooled to 25° C. and 7.5 ml of the methacrylonitrile solution were syringed into the polymerization mixture. The polymerization solution was thoroughly mixed and allowed to stand for about 18 hours. Two ml of an acidic methanol solution containing a phenolic antioxidant were syringed into the polymerization bottle to terminate polymerization and stabilize the polymer. The polymer was coagulated and dried at 50° C. This polymer was polymethacrylonitrile-polystyrene-polybutadiene-polystyrene-polymethacrylonitrile. The molecular weights were about 18,000 for the polystyrene blocks, about 54,000 for the polybutadiene block and about 4700 for the polymethacrylonitrile blocks. The 10 gm of polymer contained 9.4 percent by weight of methacrylonitrile. The polymer had a DSV of 1.72 and contained 20 percent gel measured in toluene at 30° C.; however, the five-membered block polymer was completely soluble in a 50—50 mixture of toluene and dimethylformamide, indicating that the polymer had resistance to aromatic solvents but was not a crosslinked polymer. At 75° F. the five-membered block polymer had an ultimate tensile of 2300 pounds per square inch (psi) at 720 percent elongation. The control block polymer to which no methacrylonitrile had been added had a DSV of 1.64 and 2.4 percent gel in toluene at 30° C. The control polymer had ultimate tensile of 1600 psi at 830 percent elongation.

EXAMPLE II

A tapered polystyrene-polybutadiene-polystyrene block polymer was prepared using similar procedures as Example I except that 1.4 ml of a 0.20 M solution of dilithiopolyisoprene was the initiator.

The methacrylonitrile solution was prepared similar to Example I except that 2 gm of methacrylonitrile were used in the 10 ml solution and the gas chromatographic analysis showed the solution contained 1.12 gm of methacrylonitrile after sparging.

To the polymerization bottle was added 20 ml of the methacrylonitrile solution.

The isolated five-membered block polymer had a DSV of 1.52 and 37 percent gel in toluene at 30° C. The molecular weights were about 11,000 for the polystyrene blocks, about 32,000 for the polybutadiene block and about 4,200 for the polymethacrylonitrile blocks. The polymer was completely soluble in an equivolume mixture of dimethylformamide, methyl ethyl ketone and toluene. The polymer had an ultimate tensile of 2350 psi at 710 percent elongation.

The control polymer to which no methacrylonitrile was added had a DSV of 1.36 and 2.6 percent gel in toluene at 30° C. The control polymer had an ultimate tensile of 1860 psi at 1120 percent elongation.

EXAMPLE III

This example shows that the polymethacrylonitrile-polybutadiene-polymethacrylonitrile can be made but does not possess good physical properties. It would not be expected that the polystyrene-polybutadiene-polystyrene polymers made in Examples I and II when coupled with the polymer made in this example would result in such superior properties.

A solution was prepared to contain 6 gm of butadiene in 160 ml of benzene solution. The solution was passed through silica gel and charged to a reaction bottle. The solution was sparged with nitrogen and 1.1 ml of a 0.20 M benzene solution of dilithiodiisoprene was added. The reaction bottle was capped and tumbled in a water bath at 50° C. for about 3.5 hours. The bottle was allowed to cool to about 25° C.

A solution was prepared to contain 2 gm of methacrylonitrile in every 10 ml benzene solution. This solution was passed through silica gel column and sparged with nitrogen. Fifteen ml of the methacrylonitrile solution were syringed into the "living" polybutadiene solution. The solutions were allowed to stand at 25° C. for about 16 hours.

The polymer cement was coagulated in acidified methanol containing a phenolic antioxidant. The polymer was dried in vacuo at 50° C. The block polymer had a DSV of 1.47 and a gel content of 58.1 percent in toluene at 30° C. The block polymer had a tensile strength of 202 psi at 160 percent elongation. The polymer was analyzed to contain 21.5 percent by weight of methacrylonitrile.

While certain representative embodiments and details have been shown for the purpose of illustrating the invention, it will be apparent to those skilled in this art that various changes and modifications may be made therein without departing from the spirit or scope of the invention.

What is claimed is:

1. Process for preparation of A'X'A' novel block polymers comprising the steps of polymerizing a solution of a conjugated diene (C) and a styrene or alkyl substituted styrene (B) by contacting said solution with an organodilithium catalyst wherein a conjugated diene-styrene tapered block polymer (X') is formed and characterized in that the conjugated diene units predominate at the central portion of said block polymer with styrene or alkyl substituted styrene being randomly distributed throughout the conjugated diene units and progressively changing in composition until the polystyrene or polyalkyl substituted styrene predominates at the end of said tapered block polymer and injecting methacrylonitrile (A) into the polymerizing zone and continuing the polymerization to form polymethacrylonitrile (A') resulting in the block polymer A'X'A'.

2. A process according to claim 1 in which the conjugated diene contains from 4 to 8 carbon atoms.

3. A process according to claim 1 in which the alkyl substituted styrene is selected from the group consisting of vinyl toluene, p(t-butyl) styrene, vinyl xylene and p(-ethyl) styrene.

4. The block polymers prepared from the steps of polymerizing a solution of a conjugated diene (C) and a styrene or alkyl substituted styrene (B) by contacting said solution with an organodilithium catalyst wherein a conjugated diene-styrene tapered block polymer (X') is formed and injecting methacrylonitrile (A) into the polymerizing zone and continuing the polymerization to form polymethacrylonitrile (A') resulting in the block polymer A'X'A'.

5. An A'X'A' block polymer composition consisting of (A') polymethylacrylonitrile-(X') tapered block polymer formed from conjugated diene units (C) and styrene or alkyl substituted styrene units (B) characterized in that the conjugated diene units predominate at the central portion of said tapered block polymer with styrene or alkyl substituted styrene units being randomly distributed throughout the conjugated diene units and progressively changing in composition until the styrene or alkyl substituted styrene units predominate at the end of said tapered block polymer -(A') polymethylacrylonitrile.

6. A block polymer composition according to claim 5 wherein the conjugated diene units contain from 4 to 8 carbon atoms.

7. A block polymer composition according to claim 5 wherein the alkyl substituted styrene is selected from the group consisting of vinyl toluene, p(t-butyl) styrene, vinyl xylene and p(ethyl) styrene.

8. An A'X'A' block polymer composition according to claim 5 wherein the predominately poly(conjugated diene) unit's molecular weight is from about 40,000 to about 150,000, the predominately polystyrene or alkyl substituted polystyrene unit's molecular weight is from about 10,000 to about 50,000 and the polymethacrylonitrile block molecular weight is from about 1000 to about 20,000 and said polymethacrylonitrile comprises about 5 to 20 percent by weight of the total block polymer.

* * * * *